Patented Apr. 29, 1941

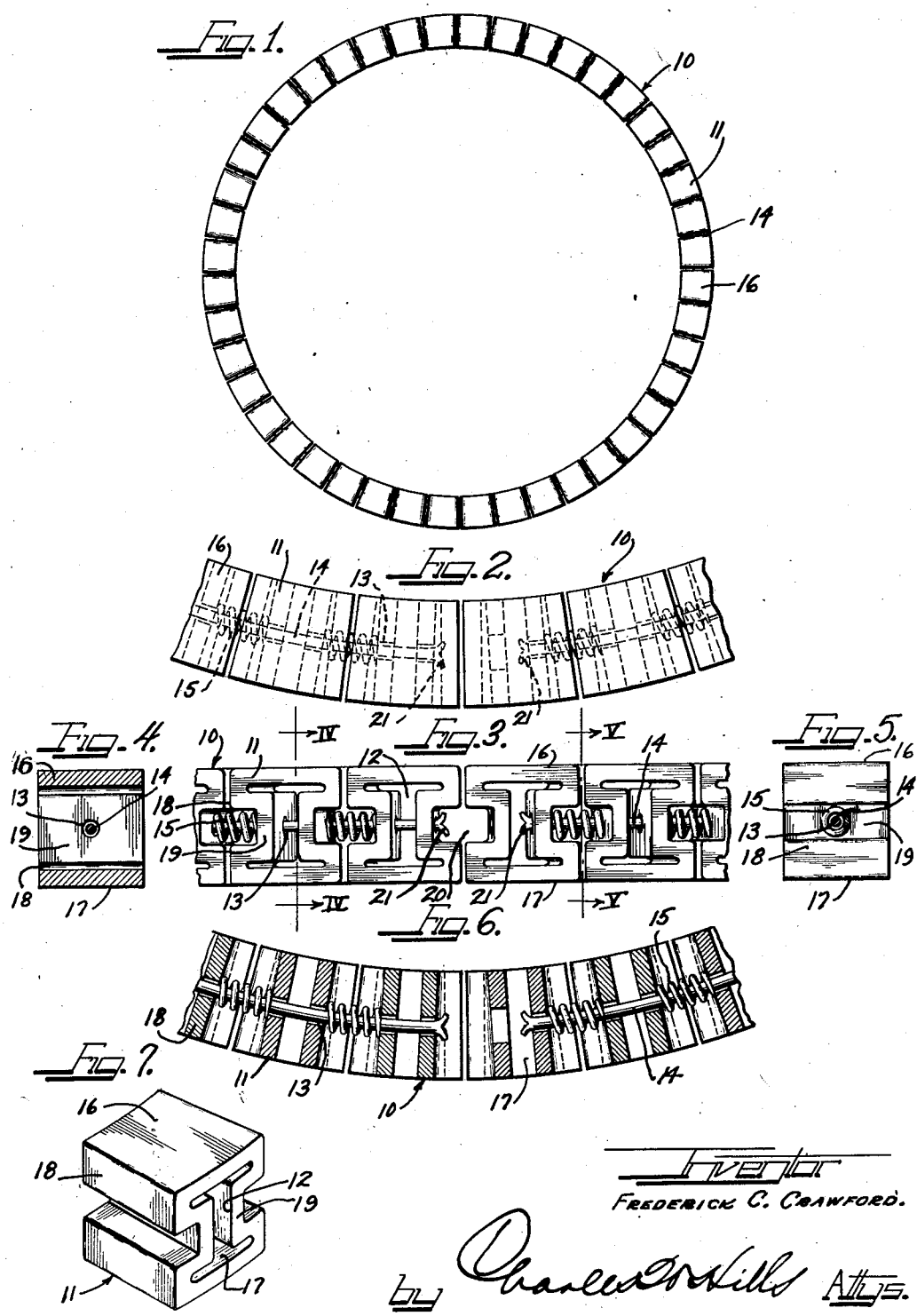
April 29, 1941. F. C. CRAWFORD 2,239,703
FLEXIBLE PISTON RING
Filed July 31, 1939 2 Sheets-Sheet 1
Inventor
FREDERICK C. CRAWFORD

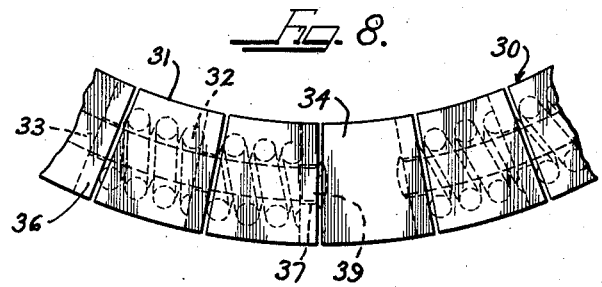
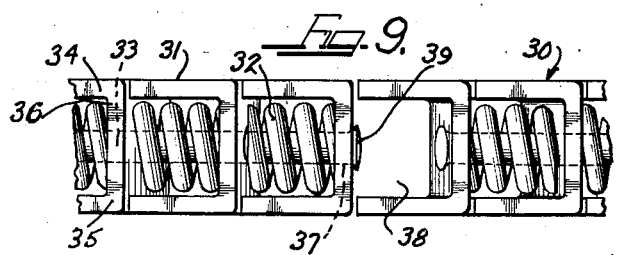
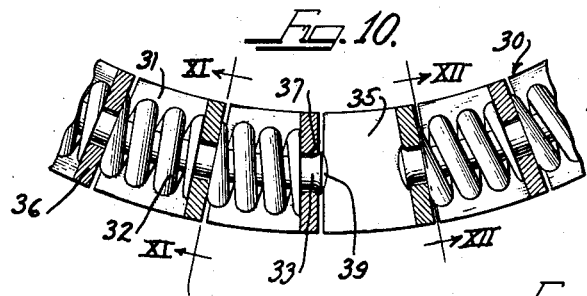
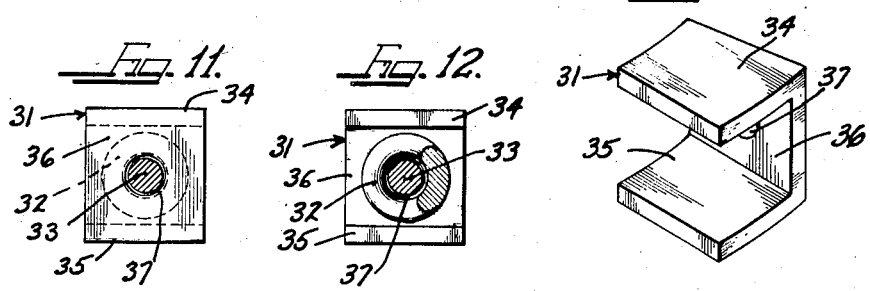

2,239,703

UNITED STATES PATENT OFFICE 2,239,703

FLEXIBLE PISTON RING

Frederick C. Crawford, Cleveland, Ohio, assignor to Thompson Products, Incorporated, Cleveland, Ohio, a corporation of Ohio Application July 31, 1939, Serial No. 287,478

16 Claims. (Cl. 309—45)

This invention relates to packing rings. More particularly the invention pertains to a circumferentially resilient piston ring comprising a plurality of radially extending cells capable of abutting laterally.

It has heretofore been proposed to fabricate piston rings comprising a plurality of radially extending tubes joined laterally to form an integral one-piece ring structure.

The present invention departs radically from the prior art in providing a circumferentially resilient piston ring comprising a plurality of radially extending independent cellular members adapted to abut laterally, resilient members disposed intermediate said cellular members, and means holding said members in circular alignment in such manner as to permit relative circumferential movement of the parts.

It is therefore an important object of the present invention to provide a circumferentially resilient piston ring comprising a plurality of radially extending cellular members adapted to abut laterally, resilient members disposed intermediate said cellular members, and means holding said members in circular alignment in such manner as to permit relative circumferential movement of the parts.

Other and further important objects of the present invention will be apparent from the disclosure in the specification and the accompanying drawings.

This invention (in a preferred form) is illustrated in the drawings and hereinafter more fully described.

In the drawings:

Figure 1 is a top plan view of an assembled piston ring embodying the principles of this invention.

Figure 2 is a fragmentary enlarged top plan view of the ring of Figure 1.

Figure 3 is a fragmentary enlarged perspective side view of the ring of Figure 1.

Figure 4 is an enlarged cross-sectional view taken along the line IV—IV of Figure 3.

Figure 5 is an enlarged cross-sectional view taken along the line V—V of Figure 3.

Figure 6 is a fragmentary enlarged view of a horizontal section through the ring of Figure 1.

Figure 7 is an enlarged perspective view of one of the cells forming the piston ring.

Figure 8 is a fragmentary enlarged top plan view of another piston ring embodying the principles of the present invention.

Figure 9 is a fragmentary enlarged perspective side view of the ring of Figure 8.

Figure 10 is a fragmentary enlarged view of a horizontal section through the ring of Figure 8.

Figure 11 is an enlarged cross-sectional view taken along the line XI—XI of Figure 10.

Figure 12 is an enlarged cross-sectional view taken along the line XII—XII of Figure 10.

Figure 13 is an enlarged perspective view of one of the cellular members forming the piston ring of Figure 8.

As shown on the drawings:

In Figures 1, 2, 3 and 6 the reference numeral 10 indicates generally a piston ring embodying the principles of the present invention. The ring 10 is composed of a plurality of similar convergent radially disposed cells 11 which may be fabricated from resilient sheet metal. Each cell 11 defines a radially open ended oil passage 12. Lateral apertures 13 pierce each cell along the body axis of the ring and serve to movably receive a tie wire 14. Coil springs 15 are movably threaded upon the tie wire 14 intermediate the cells 11.

As shown in Figures 4, 5 and 7, each cell 11 comprises a flat horizontal top wall 16 and a flat horizontal bottom wall 17. These top and bottom walls are connected by vertical side walls 18. The corners forming the transition from top and bottom to side walls are preferably as sharp as possible, to facilitate close mutual approach of the individual cells 11 whose flush top and bottom walls form the then practically continuous upper and lower surfaces of the ring 10.

Figures 2, 6 and 7 show how each cell 11 converges radially inward so as to provide an outer face that is larger than the inner face. The side walls of the adjacent cells can thus contact along substantially their entire length when the cells are annularly disposed as shown.

The side walls 18 of the cells 11 comprise inwardly radially recessed portions 19 which are pierced by the hereinabove mentioned centrally aligned apertures 13. The recessed wall portions 19 of adjacent pairs of cells 11 together define spaces 20 of which all but one accommodate coil springs 15 urging the cells 11 apart.

The tie wire 14 may be either round or flat. In any case the shape of the apertures 13 conforms to that of the tie wire. The latter threads all the cells 11, all the coil springs 15, all the spaces 20 containing coil springs 15, and all of the apertures 13 except, optionally, one or both of the apertures 13 opening into that one space 20 which does not contain any coil spring.

The ends 21 of the tie wire 14 are split and flared to project over the edges of the apertures 13 adjacent thereto. All adjacent cells 11 are thus tied together at both sides thereof except the pair of adjacent cells receiving the ends 21 of the tie wire as shown in Figures 2, 3 and 6. These cells can be spread apart from each other to expand the ring for permitting its insertion into a piston ring groove.

In Figures 8, 9 and 10 the reference numeral 30 indicates generally a modification of the ring 10 comprising, similarly to the latter, radially convergent cells 31, which may be made of resilient sheet metal, intermediate coil springs 32, and a tie wire 33 threaded through the cells and springs to hold the same in assembled relation. However, as shown in Figures 11, 12 and 13, each cell 31 of the modified ring 30 is open on one side, being formed by a flat horizontal top wall 34 and a flat horizontal bottom wall 35 connected by a single vertical straight side wall 36. The latter wall 36 is pierced by a central aperture 37 adapted to movably receive the tie wire 33.

All the cells 31 face in the same lateral direction to define, in adjacent pairs, radial oil passages 38 which are peripherally closed when the cells abut. All but one of the oil passages 38 contains a coil spring 32 abutting and tending to spread facing side walls 36 apart. The tie wire 33 threads all the cells 31, all the coil springs 32, all the apertures 37, and all but the empty oil passage 38, into which the flared ends 39 of the tie wire 33 project. All the adjacent cells 31 are thus tied together at both sides thereof except the pair of adjacent cells receiving the ends of the tie wire as shown in Figures 8, 9 and 10. These cells can be spread apart from each other to expand the ring for permitting its insertion into a piston ring groove.

The rings 10 and 30 are compressed circumferentially when in operating position in the groove of a piston within the cylinder of an internal combustion engine. For a given cylinder a ring is suitably selected having a circumference such that a clearance of from 0.003 to 0.005 inch between the individual cells is obtained to allow for expansion in heating which effects abutment. During this compression the spaced ends 21 or 39 of the tie wires 14 or 33 approach each other, and as the cells 11 or 31 slide over the tie wires 14 or 33, the coil springs 15 or 32 are compressed. The resulting circumferentially directed spring action of the compressed coil springs urges the rings 10 or 30 against the cylinder wall with a force equal at all points.

The cells 11 or 31 of the rings 10 or 30 may be fabricated by laterally piercing short sections cut from suitably shaped tubes or channels. The finished cells are threaded transversely, in alternation with longitudinally threaded coil springs, with a tie wire, and the ends of the latter are flared.

However made, the present piston ring comprises broadly a series of radially directed cellular members alternating with resilient members urging said cellular members apart, and means for movably holding all said members in circular alignment. Said resilient members suitably comprise circumferentially directed coil springs, and said means may comprise a tie wire threading transverse apertures in said cellular members, the coil springs being threaded longitudinally.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A metallic packing ring comprising a plurality of radially extending cellular members capable of abutting laterally, a plurality of resilient members disposed intermediate said cellular members, and ring means for holding all said members in assembled relation.

2. A metallic packing ring comprising a plurality of members capable of abutting laterally and having top and bottom walls and at least one side wall connecting said top and bottom walls, a plurality of resilient members disposed intermediate said members capable of abutting laterally, and ring means for movably holding said members in circular alignment.

3. A metallic packing ring comprising a plurality of similar members capable of abutting laterally and having top and bottom walls and at least one side wall connecting said top and bottom walls, a plurality of resilient members disposed intermediate said members capable of abutting laterally, and a tie wire threading all said members to hold the same together while permitting relative circumferential movement thereof.

4. A metallic piston ring comprising a split annular member composed of individual open faced cells, a plurality of springs disposed intermediate said cells, and a tie wire threaded through said cells and springs to hold the same together.

5. A metallic piston ring comprising a split annular member composed of individual open faced cells, a plurality of springs disposed intermediate all but one mutually adjacent pair of said cells, and a tie wire slidably threaded through said cells and springs to hold the same together.

6. A metallic piston ring comprising an annular tie wire, similar individual open faced radially convergent cells transversely threaded by said tie wire, and coil springs longitudinally threaded by said tie wire and disposed intermediate said cells.

7. A metallic piston ring comprising a plurality of radially open faced cells having top, bottom and two side walls, the latter being radially recessed and pierced by transverse apertures, circumferentially directed coil springs disposed within said recesses, and a tie wire threading said apertures and said coil springs, to hold the parts of said ring in circular alignment while permitting relative circumferential movement thereof.

8. A metallic piston ring comprising a plurality of similar radially open faced and convergent cells having top, bottom, and two side walls, the latter being centrally radially recessed and pierced in said recess by transverse apertures aligned along the body axis of said ring, circumferentially directed coil springs disposed intermediate all but one adjacent pair of said cells and extending into said recesses, and an annular tie wire movably threading said cells through said apertures and said coil springs, to hold the parts of said ring in circular alignment.

9. A metallic piston ring comprising a plurality of similar radially open ended and convergent cells adapted to form peripherally closed radial oil passages and having radially recessed side walls pierced by apertures aligned along the body axis of said ring, circumferentially extending coil springs disposed intermediate all but one adjacent pair of said cells and extending into the recesses of the side walls of said cells, and an annular split tie wire having spaced flared ends threading all said cells through said apertures and all said coil springs and having its flared ends projecting into said two recesses without a spring, to circumferentially movably hold said cells and springs in circular alignment.

10. A metallic packing ring comprising a plurality of individual cells, springs urging said cells apart and tying means for holding said cells and springs together.

11. A piston ring according to claim 9 in which the intersecting marginal portions of the top, bottom and outer side walls are flat, and the corners forming the transition from top and bottom walls to side walls are sharp.

12. A metallic piston ring comprising a plurality of cells open radially and on one side, the other side being pierced by a central aperture, circumferentially directed coil springs disposed within said cells and projecting therefrom, and a tie wire threading said apertures and said springs, to hold the parts of said ring in circular alignment while permitting relative circumferential movement.

13. A metallic piston ring comprising a plurality of radially open faced and convergent cells each having a top wall, a bottom wall and a single side wall, said side wall being pierced by a central aperture, circumferentially directed coil springs disposed within said cells and projecting therefrom, and an annular tie wire movably threading said apertures and said springs, to hold the parts of said ring in circular alignment.

14. A metallic piston ring comprising a plurality of similar radially open ended and convergent cells each having top and bottom walls and a single side wall pierced by a central aperture, said cells facing in the same circumferential direction so as to be capable of forming, in abutting pairs, peripherally closed radial oil passages, circumferentially extending coil springs disposed within all but one of said cells and projecting therefrom, and an annular split tie wire having spaced flared ends threading all said apertures and all said coil springs and having its flared ends projecting into said cell without a spring to circumferentially movably hold said cells and said springs in circular alignment.

15. A metallic packing ring comprising radially disposed individual cells, springs between the individual cells and a tie wire threaded through said cells and springs holding the same in annular relation, said cells being sized for providing gaps of from 0.003 to 0.005 inch therebetween when said packing ring is seated in an unheated cylinder to accommodate expansion when the cylinder is heated.

16. A piston ring according to claim 14 in which the top, bottom and side walls are flat and the corners forming the transition from top and bottom walls to side walls are sharp.

FREDERICK C. CRAWFORD.